UNITED STATES PATENT OFFICE.

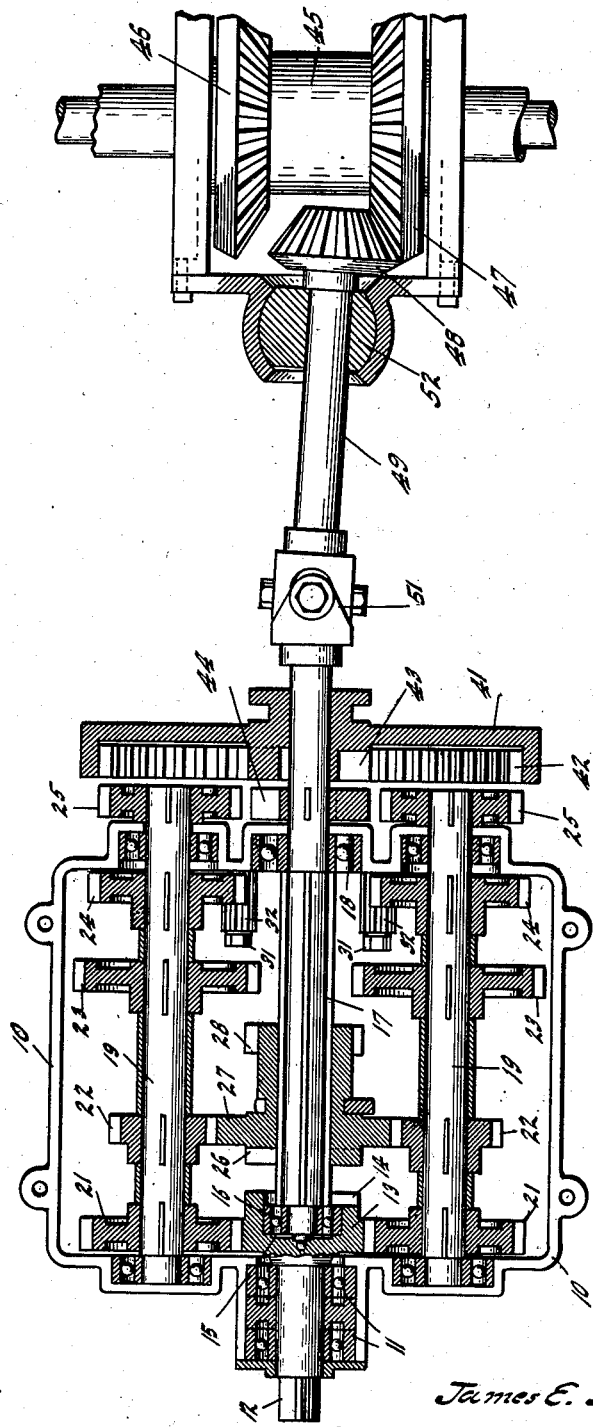

JAMES E. HINCHMAN, OF RUSHVILLE, INDIANA.

SPEED-CHANGING GEARING.

1,149,515.

Specification of Letters Patent.

Patented Aug. 10, 1915.

Application filed October 1, 1910. Serial No. 584,857.

*To all whom it may concern:*

Be it known that I, JAMES E. HINCHMAN, a citizen of the United States, residing at Rushville, in the county of Rush and State of Indiana, have invented a new and useful Speed-Changing Gearing, of which the following is a specification.

In transmission gearing, such as is commonly used in automobiles for varying the speed of the car, it is common to provide a power shaft, a transmitting shaft, and an intermediate shaft, with intermeshing gears which may be relatively shifted in order to vary the power connection between the power shaft and the transmission shaft, but in all those devices with which I am familiar there is but one active countershaft at any one time and the consequence is that there is a very considerable side thrust upon the several shafts due to the interaction of the gears.

The object of my present invention is, therefore, to provide a transmission gearing wherein the power shaft and transmission shafts are preferably in direct alinement and the gears of which simultaneously mesh with identical corresponding gears upon a multiplicity of countershafts balanced about the power shaft and transmission shaft axes so that the power shaft and transmission shaft will practically float between the several countershafts.

A further object of my invention is to provide a supplemental train of gearing by means of which the transmission shaft may be driven at a very low speed.

The accompanying drawing, which is an axial section, illustrates a desirable embodiment of my invention.

In the drawings, 10 indicates a suitable inclosing casing having at one end a bearing 11 within which is mounted the power shaft 12, said power shaft carrying, at its inner end, a gear 13 and a clutch member 14. In the present form the gear 13 is provided with an axial pocket 15 receiving a bearing 16 which supports the inner end of the transmission shaft 17, said shaft being extended through the opposite side of the casing 10 and supported by a suitable bearing 18.

Mounted in suitable bearings in casing 10, and balanced about the axes of shafts 12 and 17, are several countershafts 19 each countershaft carrying an identical series of gears.

It will be readily understood that the exact arrangement of these gears will depend upon the uses to which the apparatus is put and the present drawing is intended therefore merely as illustrative. In the present drawing, each countershaft 19 carries a gear 21 which meshes with gear 13. Each countershaft also carries gears 22, 23 and 24 within casing 10 and one end of each countershaft is projected through the casing and provided at its outer end with a gear 25. Splined upon shaft 17 is a compound gear and clutch member comprising clutch member 26 and gears 27 and 28, the construction and proportions being such that the clutch member 26 may engage with clutch member 14 when gears 27 and 28 are both out of mesh with their corresponding gears on the countershaft, and such that gears 27 and 28 may be meshed alternately with the gears 22 and 23 of the countershafts.

For the purpose of permitting reverse at comparatively high speed I provide, within casing 10, as many stud shafts 31 as there are countershafts 19 and each of these stud shafts carries a long gear 32 which meshes with an adjacent gear 24 and is of sufficient length to permit gear 28 to be slid into mesh with it, in an ordinary manner.

The shaft 17 at its outer end is connected to the traction wheels of an automobile in any desired manner and upon the outer end of this shaft I mount an internal transmission gear 41 which is preferably provided with internal gear 42 adapted to mesh with all of the gears 25. This gear may be splined upon the shaft so as to rotate continuously therewith but I prefer to mount the gear freely upon the shaft and provide it with a clutch element 43 adapted to intermesh with a clutch element 44 carried by shaft 17, the arrangement being such that when gear 42 is thrown out of mesh with gears 25 the two clutch elements will be separated and the shaft 17 thus rotate freely within the member 41.

It will be understood that suitable shifting elements will be provided by means of which the member 41 and the compound member 26—27—28 may be shifted to desired positions.

In order to obtain the advantage of the internal gear 42 either for forward or backward movement the usual differential gearing 45 may be provided with oppositely arranged beveled gears 46 and 47 either of which is adapted to be engaged by the driving pinion 48 carried by shaft 49 connected by universal joint 51 with shaft 17. Any suitable means may be provided for causing the proper mesh of gear 48 with either of the gears 46 or 47 and in the present drawing I have shown a common structure consisting of an eccentric 52 which carries bearings for shaft 49, the arrangement being such that a half revolution of the eccentric will shift gear 48 laterally from one of the differential gears to the other.

In operation, the desired speeds may be obtained by proper shifting of the compound element 26—27—28 and whenever this element is placed so that the power is transmitted through gears to the shaft 17 it will be noticed that such transmission takes place through two or more sets of countershaft gears and consequently, because these countershafts are balanced about the axis of the driving shaft, the side thrusts due to the meshing of the main shaft gears with the countershaft gears, are balanced about the axes of the main shafts, thus relieving the bearings and increasing the efficiency of the apparatus.

When the compound element 26—27—28 is shifted into an inactive position the gear 42 may be shifted into mesh with gears 25 so that the speed of shaft 17 is reduced very greatly and the power applied to the traction wheels thus greatly increased. Desired direction of movement of the traction wheels is then obtained by proper shifting of gear 48.

It will be understood that common friction elements might be substituted for the various toothed gears without departing from my invention.

I claim as my invention:

1. A power transmission gearing comprising a power shaft, a transmission shaft, a plurality of countershafts arranged alongside the power and transmission shafts, a gear carried by the power shaft, a plurality of gears one carried by each countershaft and all meshing with the gear of the power shaft, a gear carried by the transmission shaft, a plurality of gears one carried by each countershaft and arranged for simultaneous engagement with, or disengagement from, the gear on the transmission shaft, a third plurality of gears one carried by each countershaft, an internal gear carried by the transmission shaft and adapted to mesh simultaneously with all of said third plurality of gears, and means for establishing connection between the countershafts and transmission shafts through said internal gear.

2. A power transmission gearing comprising a power shaft, a transmission shaft, alined therewith, a plurality of countershafts arranged alongside the power and transmission shafts, a gear carried by the power shaft, a plurality of gears one carried by each countershaft and all meshing with the gear of the power shaft, a gear carried by the transmission shaft, a plurality of gears one carried by each countershaft and arranged for simultaneous engagement with, or disengagement from, the gear on the transmission shaft, a third plurality of gears one carried by each countershaft, an internal gear carried by the transmission shaft and adapted to mesh simultaneously with all of said third plurality of gears, and means for establishing driving connection between the countershafts and transmission shafts through said internal gear.

3. A power transmission gearing comprising a power shaft, a transmission shaft alined therewith, a countershaft arranged adjacent the power and transmission shafts, a gear carried by the power shaft, a gear carried by the countershaft and meshing with the power shaft gear, a gear carried by the transmission shaft, a gear carried by the countershaft and adapted to be meshed with, or disconnected from, the gear on the transmission shaft, a third gear carried by the countershaft, an internal gear carried by the transmission shaft and adapted to mesh with said third countershaft gear, and means for establishing connection between the countershaft and transmission shaft through said internal gear.

4. A power transmission gearing, comprising two main shafts in axial alinement, a multiplicity of counter shafts arranged alongside said main shafts, a gear carried by one of the main shafts, a plurality of gears carried by each counter shaft, the gears on each counter shaft being the same as on the other counter shafts, one gear on each counter shaft meshing with the aforesaid gear on the main shaft, a member carried by the other main shaft and movable longitudinally relatively thereto, said member comprising a clutch member for clutching the two main shafts together and one or more gear members for engagement with one or more sets of gears on the counter shafts, and a second member movable longitudinally of the second main shaft and provided with an internal gear for engagement with a set of gears on the counter shafts.

5. A power transmission gearing, comprising two main shafts in axial alinement, a multiplicity of counter shafts arranged alongside said main shafts, a gear carried by one of the main shafts, a plurality of gears carried by each counter shaft, the gears on each counter shaft being the same as those on the other counter shafts, one gear on each counter shaft meshing with the aforesaid gear on the main shaft, a member carried by the other main shaft and movable longitudinally relatively thereto, said member comprising a clutch member for clutching the two main shafts together and one or more gear members for engagement with one or more sets of gears on the counter shafts, a plurality of idler pinions meshing with gears on the counter shaft and into engagement with which a gear on said longitudinally movable member may be brought, and a second member movable longitudinally of the second main shaft and provided with an internal gear for engagement with a set of gears on the counter shafts.

In witness whereof, I have hereunto set my hand and seal at Indianapolis, Indiana, this twenty-eighth day of September, A. D. one thousand nine hundred and ten.

JAMES E. HINCHMAN. [L. S.]

Witnesses:
  GEORGE SMALLEY,
  MARION N. McCANN.